Figure 1:
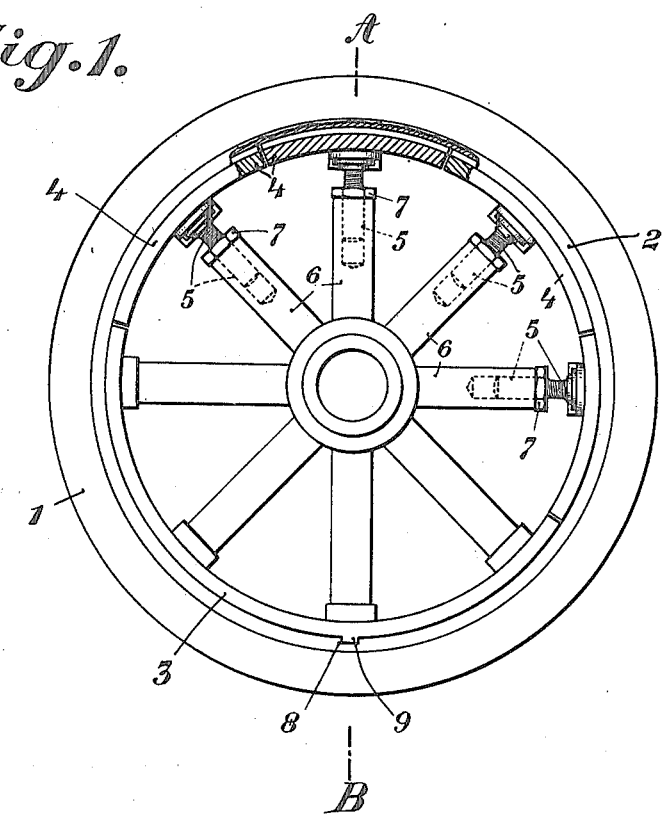

D. WIESENACKER & F. CREMER.
VEHICLE WHEEL.
APPLICATION FILED SEPT. 3, 1915.

1,181,049.

Patented Apr. 25, 1916.

Witnesses:

Inventors
Daniel Wiesenacker
Fritz Cremer
by
Attorney

UNITED STATES PATENT OFFICE.

DANIEL WIESENACKER AND FRITZ CREMER, OF FULDA, GERMANY.

VEHICLE-WHEEL.

1,181,049.                    Specification of Letters Patent.         Patented Apr. 25, 1916.

Application filed September 3, 1915. Serial No. 48,915.

*To all whom it may concern:*

Be it known that we, DANIEL WIESEN-ACKER and FRITZ CREMER, subjects of the German Emperor, residing at Fulda, Kingdom of Prussia, Germany, have invented certain new and useful Improvements in Vehicle-Wheels, of which the following is a specification.

Wheels for motor cars with removable tires of solid rubber, also such as are secured to a special iron cycle, are already known. The hitherto known removable tires of solid rubber, wherein the tire is secured to an iron cycle by vulcanization, have been fastened to the rim, connected to the spokes and the hub so as to form a rigid piece, either by means of wedges or the conical iron cycle is pressed onto the correspondingly shaped conical rim and affixed there by means of screws and the like. It is, furthermore, known to make wheels, which are to be provided with tires of solid rubber, of such a design that the rim be divided into an optional number of segments, fastened to spokes adjustable in their length. In this case the spokes had only to be shortened and the tire of solid rubber mounted on the rim provided with lateral borders, and secured by tightening of the screws on the spokes. Hence the rubber tire was mainly held on the rim by its elasticity.

The disadvantages heretofore present in the application of known forms of tires of solid rubber may be avoided by making the rim consist of a rigid arc-piece of approximately half the circumference of the wheel, connected in the usual manner to the spokes and the hub, and several other segments constituting the remaining part of the rim, each of which being adapted to be withdrawn in the usual manner into the interior of the wheel, by shortening the spokes, so as to grant the possibility of mounting the iron cycle of the tire of solid rubber on the wheel, the rim-parts of which engage with a central, ring-shaped rib, a corresponding groove of the iron cycle.

With the present wheel about half the number of the spokes are adapted to be shortened and, together with the iron wheel, a tire of solid rubber, fixed on said iron cycle is employed. The same has the correct inside diameter, so that it may be mounted on the rim after an insignificant shortening of the few adjustable spokes. The annular groove and the annular rib provided for in the rim and the cycle respectively insure the correct position of the tire on the rim, prevent lateral movement of the segments and the cycle itself produces a uniform distribution of the pressure.

In the drawing a form of carrying out this invention is represented.

Figure 2:
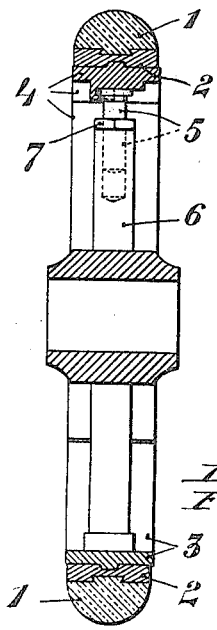

Figure 1 shows the wheel of a motor car in a partly sectioned side-view and Fig. 2 is a cross-section according to the line A—B of Fig. 1.

1 is the tire of solid rubber fitted with an inner iron cycle 2.

3 is the rim, divided at about its middle, the parts being designated by 4. These parts are mounted on the screw-bolts 5 engaging the spokes 6 which have the shape of corresponding nuts. Either the parts 4 of the rim are removable from the rim or they are arranged in such a manner that the parts 4 of the rim will drop when the screw-bolts are turned. Counter-nuts 7 insure the affixing. In the embodiment of the invention shown in the drawing the iron cycle 2 has a circular groove and both the rim 3 and its parts 4 have a corresponding rib which engages the groove of the iron cycle.

If the tire of solid rubber is to be exchanged, the counter-nuts are to be loosened and the screw-bolts 5 are slackened and turned back. Hence the diameter of the rim 3 is diminished, when it is possible to remove the tire 1 of solid rubber from the rim and fit a new matching tire. In this operation the iron cycle 2 and, with it, that of the tire of solid rubber can be secured by the arrangement of the screw-bolts 5 and the counter-nuts in such a manner that the tire of solid rubber is held reliably fast. The cross-groove in the iron cycle 2, which acts in common with a rib 9 in the rim, prevents any shifting of the tire of solid rubber on the rim.

What we claim as our invention and desire to secure by United States Letters Patent is:—

A wheel for cars comprising a removable tire of solid rubber having a metal cycle, a rim consisting of a rigid arc piece of about one-half the circumference of the wheel and several segments forming the remainder of the rim, the wheel having spokes to which in part the said rigid arc piece is secured, the several rim segments having annular ribs and the metal cycle formed with grooves to receive the said ribs, the spokes in line with the segments of the rim being shorter than those secured to the rigid arc piece of the rim, and adjusting means between the ends of the said shorter spokes and the segments for moving the latter inwardly and outwardly in radial planes to regulate the securement of the tire on the rim.

In testimony whereof we have hereunto set out hands in presence of two subscribing witnesses.

DANIEL WIESENACKER.
FRITZ CREMER.

Witnesses:
H. W. HARRIS,
CARL GRUND.